Aug. 2, 1960 C. J. BROWN 2,947,975

AUTOMATIC CLIPPING CIRCUIT

Filed May 21, 1957

INVENTOR.
CAROLL J. BROWN
BY
Lippincott & Smith
ATTORNEYS 2,947,975

AUTOMATIC CLIPPING CIRCUIT

Caroll J. Brown, San Jose, Calif., assignor to International Business Machines Corporation, New York, N.Y., a corporation of New York Filed May 21, 1957, Ser. No. 660,556

6 Claims. (Cl. 340—173)

Figures 1, 2:
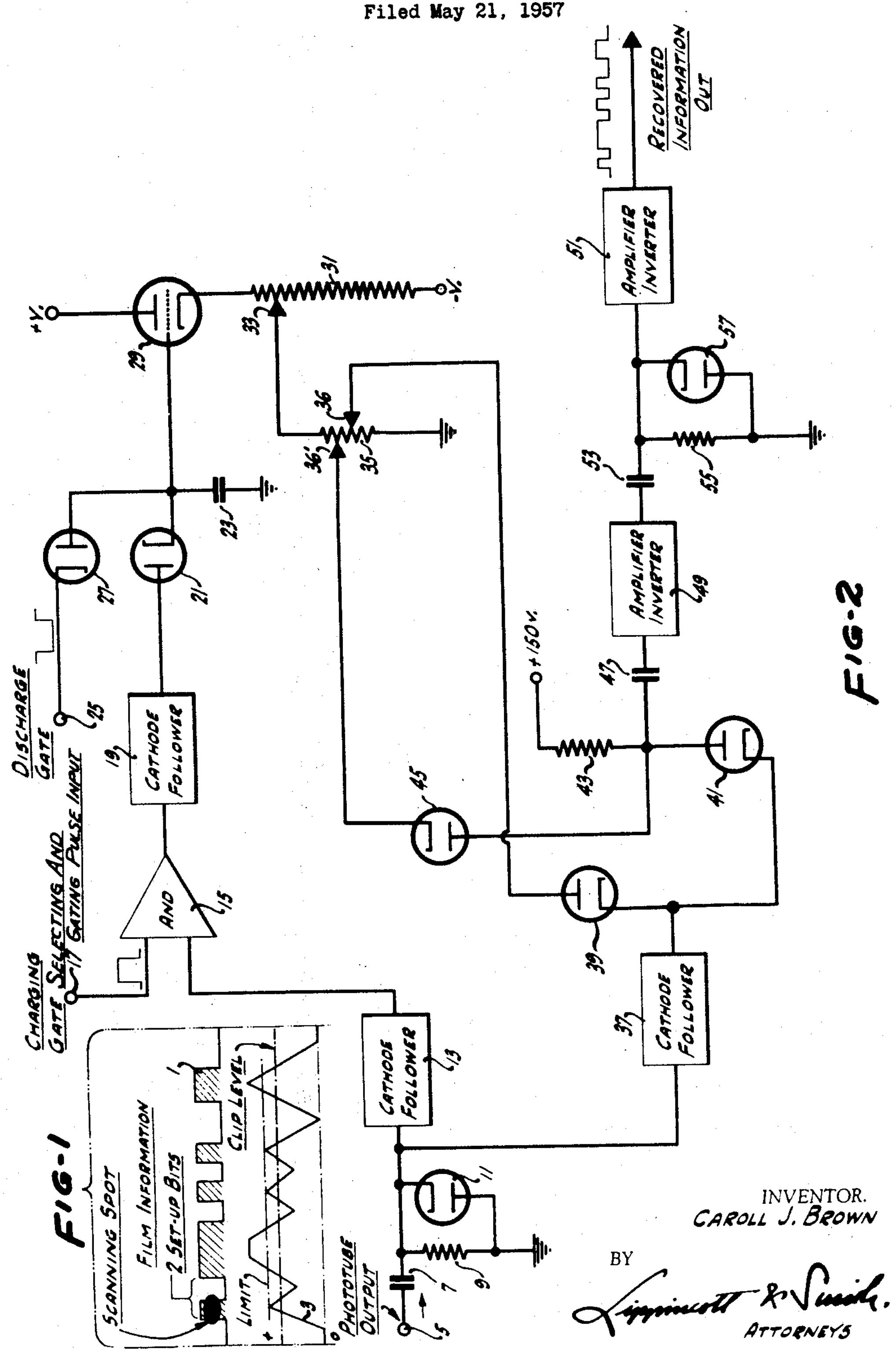

This invention relates to the recovery of binary digital information. As is now generally understood, such information is recorded as "bits" each bit representing either zero or one. In electronic computers a great deal of such information must be stored in the memory portion of the device in such manner that it can be fed back to the computing circuits at proper epochs of the computations being carried out.

There are numerous methods of making the records of the information and of reproducing such records. For many purposes magnetic recording on a tape, disc, or drum is the most satisfactory, in which case 0 can be represented by an ummagnetized portion of the recording medium and 1 by a magnetized portion, or the two figures can be represented by magnetization in opposite polarities. There are other circumstances where it is more convenient to record in some visible fashion. For instance, digit 1 can be represented by a hole punched in a card and 0 by an unpunched portion, or the information can be recorded photographically on film where, for example, one digit may be represented by a clear spot on the film and the other by an opaque spot. Whatever the method of recording used the information is recovered by traversing the record with a scanning element. With a punched card this may be a conductive brush or feeler. In magnetic recordings it will be a gap in a magnetic circuit and with photographic recording it will be a spot of light, this latter scanning element also being effective in the case of a punched card record.

One of the most satisfactory methods of recovering information that has been recorded visibly is by means of a "flying spot" scanner. This device comprises a cathode-ray tube having a fluorescent screen across which the beam of cathode rays is deflected to produce a moving spot of visible light. An image of this spot is focused upon the record so as to trace a path across the recorded information. The beam is deflected by a sawtooth wave, moving across the screen at constant speed and then flying back to its initial position at much higher velocity. A photocell can pick up either the light reflected from the alternating light and dark portions of the record or transmitted through these portions. In addition to its scanning movement the beam can be deflected laterally across the record so as to pick up, at will, any of many recordings made side-by-side.

With large amounts of information to be recorded, it is desirable to condense the record as far as this is possible. One method of recording to accomplish this is the use of "non-return-to-zero" or "NRZ" records. In this system of recording each bit is allotted a unit length along the record and adjacent bits of information are recorded without intervals between them. Thus considering an optical record wherein 0 is represented by white or clear film while 1 is represented by black or opaque film, the number 101 would be represented by a black spot, a white spot and a succeeding black spot, while the number 111 would be represented by a black spot three units long.

When a record of this character is scanned by the flying spot method certain difficulties arise. The spot and its image do not constitute areas of fixed size and uniform illumination, but the light spot is most intense at the center and fades out somewhat gradually toward the edges and is quite often surrounded by one or more "halos" of successively decreasing intensity. As a result it is quite difficult to obtain a spot whose size is confined to the dimension of a single bit of recorded information. Thus when the number 101 is scanned, zero being white, the light reaching the photocell starts to increase as soon as the edge of the spot reaches the edge of the clear portion of the record and continues to increase until the leading edge of the spot has traversed the clear portion. As the movement of the spot continues, before its trailing edge is clear the leading edge enters the darkened area and the light is never fully exposed. An opaque portion of the record between two clear bits exhibits the reverse effect, and the spot is not at any time fully occulted. With a succession of bits of information of the same significance, however, the light of the spot will be fully transmitted to the photocell, or fully occulted, as the case may be.

As a result of these effects the waveform resulting from this type of scanning, instead of being a succession of positive and negative pulses of varying lengths and nearly rectangular waveform, is a succession of approximately triangular or trapezoidal waves of varying amplitude. The exact shape of the waveforms produced will vary somewhat with the size and shape of the scanning spot, and so will the relative amplitude of the waves produced by scanning single bits of one significance to those produced by scanning a succession of bits of like significance. The spot will practically always be small enough to be completely occulted or transmitted by two successive bits of the same significance, and the alternating components of the waveforms resulting from the scanning will be symmetrical, in the sense that the "negative" wave produced by scanning 0 will be of the same shape as the "positive" waveform produced by scanning 1, "negative" and "positive" being in this case purely arbitrary designations, since the waves may be inverted in various stages of the operation. Furthermore, the amplitude of the A.C. component produced by scanning single bits will always be in the same proportion as compared with the amplitude of waves produced by scanning two or more bits of the same significance. It is convenient to refer to the axis of symmetry about which the positive and negative amplitudes of the reproduced waves are equal as the "A.C. axis" although it may not meet the strict technical definition of this quantity in the scanning of any individual number and will not do so unless that number includes equal numbers of single and merged bits of information.

The broad purpose of the present invention is to provide a method of and means for recovering the information, contained in the waveforms thus described, in the form of substantially rectangular pulses of uniform amplitude and with the pulses representing 0 and 1 of substantially equal length. Ancillary objects are to provide means and methods of recovering such information that are not affected by varying densities in the record scanned or varying brilliancy of the scanning spot, to provide means that, once adjusted for a given scanner, will retain that adjustment indefinitely and that is simple in construction and operation. Other objects and advantages will develop and can best be explained in the detailed description of the invention to follow.

It can and will be shown hereinafter that with the type of waveform that has been described the duration of the positive and negative pulses representing single bits of information is the same only when measured along the axis of symmetry of the A.C. component of the reproduced information, this being true irrespective of the amplitude of any direct component that may be included in the reproduced signal. Considered in its broadest aspect the method of the present invention comprises clipping the reproduced signals substantially at the axis of symmetry to produce unidirectional pulses, the length of which along the clipping level is equal in time to the period allotted to one bit of information, or to an integral number thereof, as the case may be. The resulting unidirectional pulses of varying shape and amplitude are then subjected to a very high degree of amplification to steepen their wavefronts, and then are limited or clipped adjacent to their bases to reproduce the rectangular pulses desired. In order to accomplish this the preferred method is first to filter out of the reproduced waves any direct-current component of indeterminate magnitude that may exist and then re-insert a D.C. component of known magnitude, substantially equal to the maximum amplitude of the reproduced signals. Each succession of digits to be recovered is preceded in its recording by two "set-up bits" of information, not included in the number to be recovered, these set-up bits always being of the same significance irrespective of the number that follows. Thus the set-up bits can be a 1 and a 0, or two bits of like significance; positive if the D.C. component is positive or negative if the reverse is the case.

As the information to be reproduced is scanned it is sampled during the scanning of the set-up bits to develop a voltage equal to the maximum amplitude of the wave during the set-up bits interval. This voltage is stored during the entire scanning of a given succession of bits. It will always be in fixed proportion to the voltage of the axis of symmetry; i.e., to the voltage of the D.C. component. From this voltage is derived a proportional voltage at the D.C. level and this latter voltage is applied to perform the clipping operation, giving only the unidirectional half of the waveform produced by the scanning operation. Optionally, because it simplifies the apparatus used, the unidirectional wave resulting from the clipping operation can again be limited or the tops clipped to produce waves of different shape but constant amplitude and these waves can be then amplified and again limited or clipped to reproduce the desired pulses.

In a preferred form of apparatus for accomplishing the method the reproduced signals from a phototube or other scanning device are supplied with or without preamplification to an input circuit through a blocking condenser, which removes any indeterminate D.C. component, and thence go to a clamp circuit or "D.C. restorer" that reconverts the signals to unidirectional pulses. Following the clamp circuit the signals are divided into two channels. In one channel the signals are supplied to a gating or "AND" circuit, where a gating pulse, synchronized with the scanning circuit of the cathode-ray tube, selects the first two "set-up pulses" and supplies them to a peak detector where they are stored in a condenser. Voltage from this condenser is applied to the grid of a vacuum tube connected as a cathode follower, its cathode circuit comprising a voltage divider having adjustable taps so that any desired proportional voltage can be derived therefrom. The impedance of the voltage divider is high in comparison with the effective impedance of the tube and therefore the variations in voltage across the divider follow the voltage of the peak detector in substantially 1:1 ratio. The taps of the divider are set to the proportion of the peak voltage with respect to ground, represented by the D.C. component. This is applied to control a clipper in the second branch of the circuit, removing from the signal all portions of the wave of lower voltage than the D.C. component. If desired a second proportional voltage can be taken from the divider and applied to clip the tops of those of the waves that are of greater than minimum amplitude. The waves are then highly re-amplified to steepen their wave fronts and their peaks are again clipped to leave only their substantially rectangular bases.

All of the above will be more readily understood from a detailed description of a preferred embodiment of the invention which follows. This description is illustrated by the accompanying drawings, wherein:

Fig. 1 is a diagrammatic illustration of the waveforms as recorded, shown in comparison with the size of the scanning spot and of the resulting, reproduced waveforms; and Fig. 2 is a diagram, partly schematic and partly in block form, of apparatus for performing the various steps described above.

For the purposes of explanation it will be assumed that the information to be recovered by the apparatus is recorded on film in accordance with a convention wherein clear film or white represents 0 and opaque film or black denotes 1. The upper curve of Fig. 1 indicates such a recording. This recording is scanned by a "scanning spot," so designated in the drawing, of the size and shape shown, but indicated in reverse or negative for convenience of illustration. The binary number recorded represents 11101010011 and is preceded by two "set-up bits," so marked in the drawing, representing 10. The information is recorded in accordance with an NRZ syster wherein the first three digits, being of the same significance, merge into a single record or block.

In scanning this record with the optical image of the flying spot focused on the display screen of the cathode-ray tube, a photocell, located behind the film, will pass current proportional to the light transmitted by the film, resulting in a waveform approximating that shown in the lower curve 3 of Fig. 1. Because of the curvature of the leading and trailing edges of the scanning spot, the sides of the waves would not be accurately linear as shown. In spite of this slight curvature, however, the waveforms would approach closely those shown. Although the peaks would in fact be slightly rounded, the waveforms approach either the triangular or trapezoidal form, the peaks, positive or negative, produced by scanning a single isolated bit being at a lower level than those developed by scanning adjacent bits of the same significance. As delivered by the photocell the zero level may not be at the exact level indicated in the drawing; there may be some ambient light in the scanner and the black portions of the film may not be completely opaque so that there may be some zero current.

The scanning arrangement includes means for developing a positive pulse at the beginning of each sweep of the cathode ray beam, coincident with the scanning of the two set-up bits, and a negative pulse at the end of the sweep. These pulses are developed independently of the output of the phototube that develops the digital signals. Methods of so developing the pulses are well-known and as they are not a part of the present invention need not be described in detail.

Phototube output signals of the type thus described are supplied to the terminal 5, having previously been amplified if necessary to the desired average level, for example, in the neighborhood of 5 volts. The indeterminate D.C. component is removed by a blocking condenser 7. The portion of the record immediately preceding the two set-up bits is white.

A clamp or D.C. restorer, comprising a resistor 9 in parallel with a diode 11, connects from the input line to ground, the cathode of the diode connecting to the ungrounded lead of the circuit. The time constant of condenser 7 and resistor 9 is made long in comparison with the length of sweep. As a result of this arrangement peak negative pulses are grounded, setting a reference level at ground potential so that the voltages supplied beyond the clamp are all in the positive direction referred to this level. Each negative swing of maximum amplitude resets the clamp. The use of a clamp circuit of this type is important as it insures that the D.C. component of the signal is always equal or at least proportional to the maximum amplitude of the signal and the proportion is independent of ambient light on the photocell, the transmission of the clear portion of the film scanned, and the density of the dark or substantially opaque portion.

The unidirectional signals are supplied from the input circuit to two branch circuits. The first of these circuits connects to a cathode follower 13, having a high-impedance output, so that the signal in the output circuit is substantially equal in voltage above ground to the input signal, plus a small constant. The signal is then supplied to an "AND" or gating circuit 15 which passes an output signal only in the presence of a gating pulse supplied at terminals 17. As already described this gating pulse is transmitted coincidentally with the transmission of the two set-up bits from the record. It is therefore only the portion of the wave corresponding to these two set-up bits that passes to the second cathode follower 19 and thence, still in a positive sense, to the anode of a diode 21. The cathode of the diode connects to a condenser 23, the diode and condenser forming a peak detector so that the condenser is charged to the peak voltage developed by scanning the two set-up bits. The condenser holds this charge until discharged by a negative pulse supplied, at the end of the scanning sweep, to terminal 25 and the cathode of a diode 27 whose anode also connects to condenser 23. The condenser voltage is applied to the grid of a vacuum tube 29.

Tube 29 is connected as a cathode follower with a high resistance voltage-divider network comprising its cathode circuit. Resistor 31, connecting directly to the cathode, may have a value somewhere in the neighborhood of 25,000 ohms. Its low-potential end connects to a voltage source designated as —V, in the neighborhood of 100 volts negative to ground. A potentiometer tap 33 makes contact with resistor 31 adjacent to its upper end, the tap connecting through a potentiometer 35 to ground. Potentiometer 35 is provided with two taps, 36 and 36', from which are derived clipping voltages as will be described in more detail hereinafter.

The second branch of the input circuit is connected immediately preceding cathode follower 13 and connects to a similar cathode follower 37. The output circuit of cathode follower 37 connects to the cathode of a clipping diode 39, the anode of which is supplied from contact 36 on potentiometer 35.

The operation of the portion of the circuit thus far described is as follows: It is well known that the cathode of a high-mu tube, connected as a cathode follower with a high-impedance output, assumes a potential slightly positive to its grid and varying with the grid in substantially a 1:1 ratio. Signals supplied from the phototube to the input circuit may have a peak-to-peak amplitude in the neighborhood of 5 volts. The clamp in the input circuit adds to the input signal a direct positive voltage component equal to the maximum negative swing of the signals. Cathode follower 13 adds a small positive component of voltage, which will be very nearly the same as that added in the other branch of the circuit by cathode follower 37. Another small direct component is added by cathode follower 19, charging condenser 23, which is added to the peak voltage derived from the two set-up bits that are stored on condenser 23 and applied to the grid of tube 29.

When the grid of cathode follower 13 is at ground potential, on the minimum signal swing, the cathode of tube 29 will be slightly positive with respect to ground. Contact 33 is set so that under these conditions it is slightly above ground potential, the excess being equal to the increment of positive voltage above ground in the output of cathode follower 37. Thus set, it takes off only a very small percentage of the voltage drop across resistor 31. Thus if we assume that the positive increment of voltage added by cathode followers 19 and 29 is about 3 volts, the variation in voltage at the contact 33 will be in proportion to the variations in the cathode voltage and about 97 percent as great. There will appear across potentiometer 35 substantially the increment in voltage with respect to ground due to the scanning of the set-up bits. Potentiometer contact 36 can then be set to take off a proportion of this voltage representing at the clip level as shown at Fig. 1 and apply it to the anode of diode 39. This diode therefore conducts during all portions of the signal lower than the clip level and prevents the output voltage from cathode follower 37 falling below this value but when its cathode rises above this value the diode 39 ceases to conduct and the signal is passed on, with a waveform corresponding to that portion of curve 3 of Fig. 1 lying above the clip level line.

In the form of the invention shown the signal is next limited and the peaks of the waves clipped at the level indicated by the line in Fig. 1 marked "limit" or, if desired, slightly below. This is accomplished by an "AND" circuit. The output of cathode follower 37 connects to the cathode of a diode 41, the anode of which is supplied from a positive source through a resistor 43 of fairly high value. The anode of another diode 45 is connected in parallel with that of diode 41, and its cathode connects to contact 36' on potentiometer 35, which is set in proportion to the desired limit level. With two diodes 41 and 45 connected as shown, only the one whose cathode is at the lower potential will conduct. Therefore when the signal voltage rises above the limiting voltage diode 41 is effectively biased off. A blocking condenser 47 is connected in the output of the "AND" circuit.

It will be noted that the "limit" level as shown in Fig. 1 merely indicates the maximum level to which the peaks should be limited in this equipment. The limiting can be carried farther than this, making all of the peaks trapezoidal if desired.

Following the limiting and the clipping the signal is subjected to a high degree of amplification, which steepens the wave fronts of the signals and clips them further. In the present instance this amplification is accomplished in two conventional stages of amplification. The first stage 49 supplies a second stage 51 through a blocking condenser 53, followed by a clamp comprising a resistor 55 connecting to ground in parallel with a diode 57. It is because of the use, in this particular circuit, of the clamp following the first stage that the signal is limited and its peaks clipped prior to amplification in the amplifier 49, for if not limited the clamp would set to the level of the highest amplitude signals and the lower amplitude signals would be distorted.

Following the clamp the signals are re-amplified by the second inverting stage 51. As supplied to this stage, they are of sufficient amplitude greatly to overdrive the amplifier tube, swinging its grid below cut-off and beyond plate-saturation. This still further steepens the wavefronts and cuts off the top and bottom portions of the waves, giving ouput pulses which are substantially replicas of the initially recorded signals and wherein the character 1 is represented by a positive pulse, as in the initially recorded signals. It will be recognized that in a computer that is supplied with its information from a plurality of sources a common convention must always be adopted to represent 1 and 0 and throughout this specification it is assumed that 1 is represented by a positive pulse.

It will also be recognized that there are various organizations of apparatus following the clipper 39 that would give substantially the same result in the output circuit. Thus the unlimited signal could be successively amplified, without the use of an intervening limiter or clamp and the final amplifier, if sufficiently overdriven, would clip the tops and bottoms of the waves and deliver substantially rectangular pulses. The limitation would occur, however, at slightly different epochs of the waves, dependent in part upon whether the numbers transmitted consisted predominantly of zeros or of ones and therefore the waveforms would not be as uniform as with the arrangement here described. The particular instrumentalities used are therefore merely a convenient and elegant arrangement for performing the operations desired.

It is not necessary that the two set-up bits be of opposite significance, although this is convenient. They could be successive ones, in which case the potentiometer 35 would have to be set to take a smaller fraction of the peak voltage, the D.C. level being practically one-half this voltage. The important point is that with a given piece of equipment the D.C. component is a constant and that it is always a fixed proportion of the peak voltage developed by a single positive bit of information or a different but still fixed proportion of a succession of positive bits of information. Therefore when the potentiometers are set in accordance with the proper proportion of the voltage developed by the two set-up bits the clipping and limiting will take place at the proper levels, irrespective of the absolute values of the signals.

Although the invention has been described as applied to waves developed by optical scanning, similar variations in amplitude will occur when any recorded information is canned by an element of greater length than a single bit of information and the same apparatus as that described can be used to recover the desired waveforms. It is not necessary that the positive-going halves of the reproduced waves be used; the clamp on the input circuit and the diodes of the peak detector can be reversed, inserting a negative instead of a positive D.C. component, and by readjusting the contacts on the potentiometer the "AND" circuit can establish the clipping level and the clipping circuit establish the limiting level. The increments added by the various cathode followers will still be positive, and as long as they are small in comparison with the negative voltage connected to the voltage divider resistor 31 variations in voltage drop betwen the tap 33 and the cathode will be so small that they can be neglected and the constant increments set off by the tap adjustment to give an effective zero when the condenser 23 is discharged to ground potential. In this case, however, the condenser will charge negatively on the set-up bits, and the current in the resistor 35 will be supplied from the negative source and the resistor 31, instead of the positive source and the tube. The approximations involved are slightly greater, but the voltage across potentiometer 35 will still be proportional to the peak voltage at the input circuit, although not exactly equal thereto. As long as proportionality exists the clipping and limiting levels can be set, and once set will vary in proper relation to the amplitude of the input signals.

Numerous other modifications of the circuits shown will suggest themselves to those skilled in the art. The apparatus shown is therefore intended primarily as illustrative, the scope of the invention being defined by the claims which follow.

I claim:

1. Apparatus for recovering binary digital information recorded in accordance with a system whereby successive bits of like value merge into a continuous record and are reproduced by scanning the recorded information with a scanning element larger in dimension than the record of a single bit of information so recorded, resulting in an electrical signal the amplitude whereof differs as between successive bits of different significance and successive bits of like significance, comprising an input circuit for receiving the signals resulting from signals scanning, a first branch circuit derived from said input circuit, a gate in said first branch circuit operative to pass signals only in the presence of a selecting and gating pulse voltage, a peak detector following said gate for storing the maximum voltage developed by the selected portion of the signal output from the gate, and voltage divider means supplied by the voltage so stored and provided with a tap for deriving therefrom a lower voltage proportional thereto, a second branch circuit derived from said input circuit, means in said second branch circuit actuated by the voltage derived from said tap for clipping the signals derived from the input at the A.C. axis thereof, and an overdriven amplifier following said clipping means for converting the clipped signals into substantially rectangular pulses of uniform amplitude.

2. Apparatus for recovering binary digital information recorded in accordance with a system whereby successive digits of like value merge into a continuous record and are reproduced by scanning the recorded information with a scanning element larger in dimension than the record of a single bit of information so recorded, resulting in an electrical input signal the amplitude whereof differs as between successive bits of unlike significance and successive bits of like significance, said resulting signals comprising a direct voltage component and an alternating voltage component, comprising an input circuit, means connected to said input circuit for deriving from said resulting signals a voltage substantially proportional to an initial portion thereof, clipping means connected to said input circuit and connected for control by said derived voltage for deriving from said signals at said input a modified signal proportional to the departures of the input signal from the value of its direct component in one direction only, and an overdriven amplifier following said clipping means for converting said modified signal into unidirectional pulses of substantially rectangular waveform and constant amplitude.

3. Apparatus for recovering bits of binary digital information recorded in accordance with a non-return-to-zero system, each succession of bits so recorded being preceded by set-up bits and reproduced as a voltage wave by scanning said set-up bits and the succeeding information by a scanning element exceeding in length a single set-up bit, which comprises an input circuit connected to receive said voltage wave, means in said input circuit for removing any D.C. component from said wave, a clamp circuit connected across said input circuit for reinserting in said wave a D.C. component equal to the maximum amplitude of said wave, a pair of branch circuits connected to said input circuit, one of said branch circuits comprising in succession, a gate adapted to pass only the portion of said wave representative of said set-up bits, a peak detector for developing a voltage substantially equal to the said portion representative of said set-up bits plus said D.C. component, a cathode follower tube having a control grid supplied with the voltage of said peak detector and a cathode circuit of high resistance as compared to the effective impedance of said tube and comprising a voltage divider network including a first resistor connected to a source of negative potential large in comparison with the amplitude of said voltage wave, a tap on said resistor adjacent to the higher potential end thereof and a potentiometer connected from said tap to a point of zero potential; the other of said branch circuits comprising clipping means connecting to an adjustable contact on said potentiometer for removing from said voltage wave variations in one direction from the voltage developed at said adjustable contact, and means connected following said clipping means for steepening the wave fronts of the waves supplied thereto and for clipping the peaks thereof to convert said waves into substantially rectangular pulses.

4. Apparatus in accordance with claim 3 wherein said last-mentioned means comprises an overdriven amplifier.

5. Apparatus in accordance with claim 3 including means connected to a second contact on said potentiometer for limiting the amplitude of the clipped waves to the voltage developed at said second contact and wherein the last-mentioned means of said claim 6 comprises two inverting stages of amplification, at least the second of said stages being overdriven to limit the amplitude of the output waves delivered thereby by clipping the peaks thereof and a clamp circuit interposed between said stages to establish a definite level at which such clipping occurs.

6. Apparatus for recovering bits of binary digital information recorded in accordance with a non-return-to-zero system, each succession of bits so recorded being preceded by set-up bits, and reproduced as a voltage wave by scanning said set-up bits and the succeeding information by a scanning element exceeding in length a single set-up bit, comprising an input circuit for receiving input signals represented by said voltage wave, a first branch circuit derived from said input circuit, a gate in said first branch circuit operative to pass signals only in the presence of a selecting-pulse voltage, an input circuit for supplying selecting and gating pulses to the gate simultaneously with the scanning set-up bits, a peak detector following said gate for storing the maximum voltage developed by the selected portion of the passed signals, and voltage divider means supplied by the voltage so stored and provided with a tap for deriving therefrom a lower voltage proportional thereto, a second branch circuit derived from said input circuit, means in said second branch circuit actuated by the voltage derived from said tap for clipping said input signals at the A.C. axis thereof, and an overdriven amplifier following said clipping means for converting the clipped signals into substantially rectangular pulses of uniform amplitude.

References Cited in the file of this patent

UNITED STATES PATENTS 2,406,978 Wendt ------------------- Sept. 3, 1946

UNITED STATES PATENT OFFICE

CERTIFICATE OF CORRECTION

Patent No. 2,947,975 August 2, 1960

Caroll J. Brown

It is hereby certified that error appears in the printed specification of the above numbered patent requiring correction and that the said Letters Patent should read as corrected below.

Column 4, lines 25 and 26, for "syster" read -- system --; column 7, line 24, for "canned" read -- scanned --; line 67, strike out "signals", second occurrence; column 8, line 46, after "equal to the" insert -- amplitude of --; line 71, for the claim reference numeral "6" read -- 3 --.

Signed and sealed this 17th day of January 1961.

(SEAL)

Attest:

KARL H. AXLINE
Attesting Officer

ROBERT C. WATSON
Commissioner of Patents